A. J. ADAMS.
CONVERTIBLE BABY CARRIAGE AND SLEIGH.
APPLICATION FILED JULY 13, 1906.
925,151. Patented June 15, 1909.
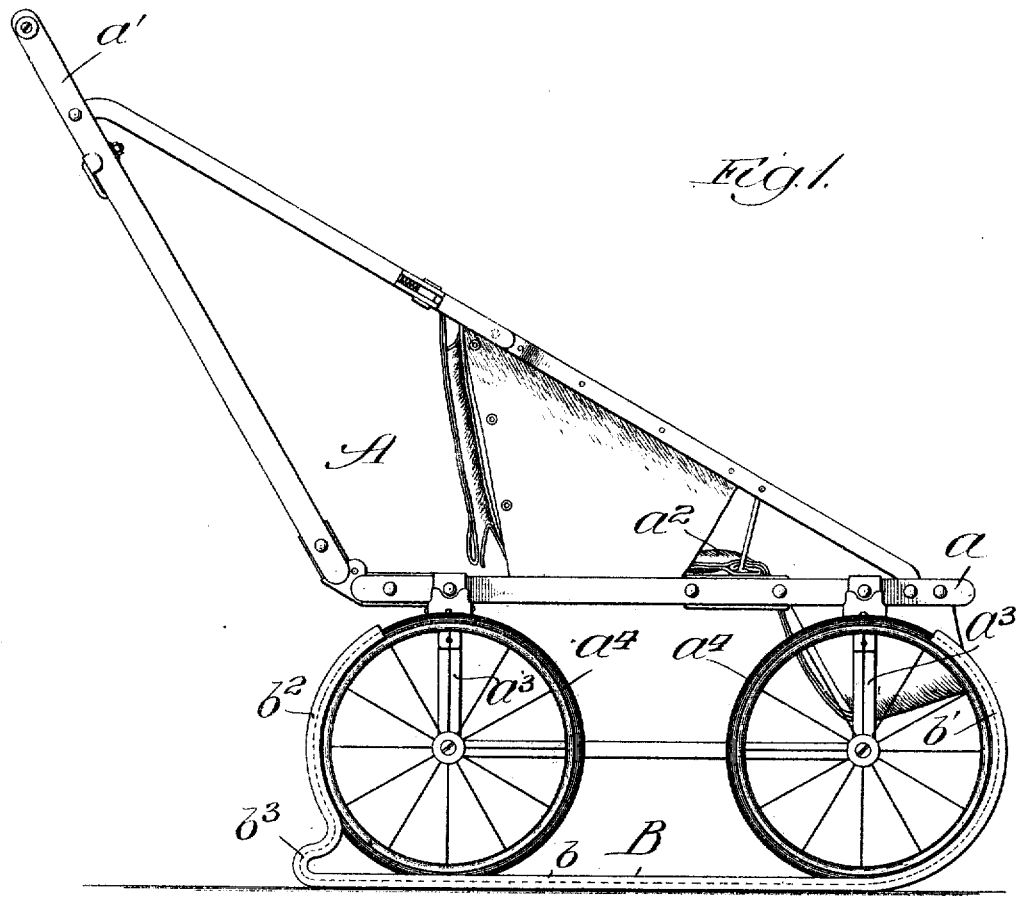
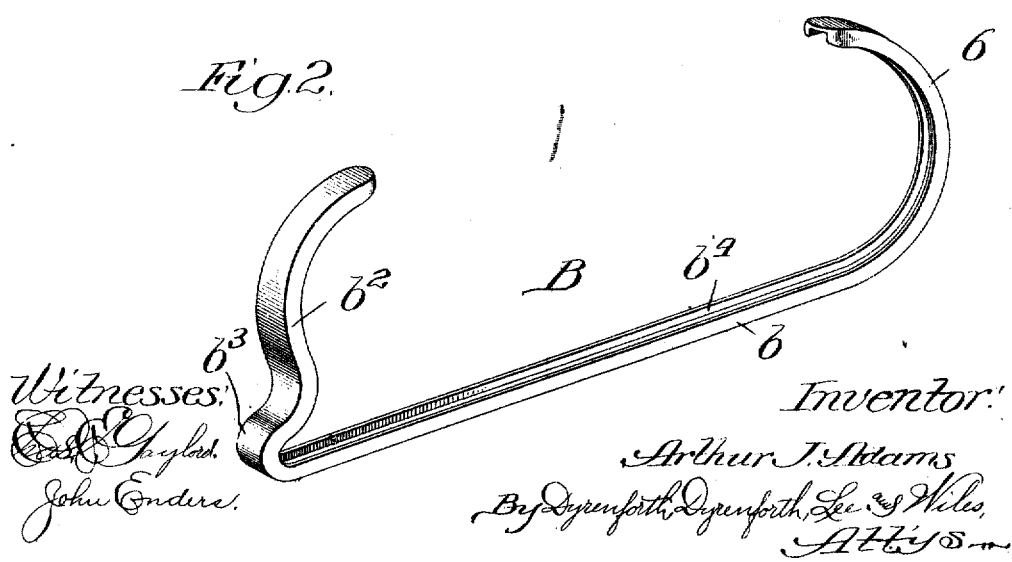

UNITED STATES PATENT OFFICE.

ARTHUR J. ADAMS, OF CHICAGO, ILLINOIS, ASSIGNOR TO FULTON MANUFACTURING COMPANY, OF CHICAGO, ILLINOIS, A CORPORATION OF ILLINOIS.

CONVERTIBLE BABY CARRIAGE AND SLEIGH.

No. 925,151.      Specification of Letters Patent.      Patented June 15, 1909.

Application filed July 13, 1906. Serial No. 326,005.

*To all whom it may concern:*

Be it known that I, ARTHUR J. ADAMS, a citizen of the United States, residing at Chicago, in the county of Cook and State of Illinois, have invented a new and useful Improvement in Convertible Baby Carriages and Sleighs, of which the following is a specification.

My invention relates particularly to means for converting a baby carriage into a sleigh; and my primary object is to provide simple, cheap and efficient means for accomplishing the purpose indicated.

My invention is illustrated in the accompanying drawing, in which—

Figure 1 represents a baby carriage having its wheels equipped with runners according to my invention; and Fig. 2, represents a perspective view of one of the runners employed.

In the drawing, A represents a baby carriage; and B runners applied to the wheels thereof. The baby carriage illustrated is of the construction described in Patent No. 789,310, granted May 9th, 1905. It is to be understood, however, that the improved runners herein shown may be applied to any baby carriage without departure from my invention.

In the construction illustrated, the carriage A is provided with a frame $a$; a handle $a^1$; a seat $a^2$; and forks $a^3$ fitted with wheels $a^4$. In the illustration shown, the wheels are of the same size, but this is not essential to the invention. Each runner B preferably comprises a channel-bar having a straight runner portion $b$, upwardly and rearwardly curved front end-portion $b^1$, and an upwardly and forwardly curved rear end-portion $b^2$ connected with the rear end of the portion $b$ by a curved heel $b^3$. The bar of which the runner is formed is of springy material, being sufficiently yielding to enable the curved portions of the runner to be sprung over the wheels, the runner clamping itself on the wheels in a manner which will be readily understood. In the formation of the runner, the channel-bar is curved in the direction of its flanges, thereby affording on the inner side of the runner a channel $b^4$ for the wheels. The heel $b^3$ serves both to prevent the vehicle from tipping backwardly and also to increase the springiness of the runners, thereby facilitating application of the runners to the wheels and removing of the runners from the wheels. It will be noted that the curved portions of the runners are of sufficient dimensions to embrace the peripheries of the wheels above the centers of the wheels when the latter rest upon the bottom portion of the runner.

The foregoing detailed description has been given for clearness of understanding only, and no undue limitation is to be understood therefrom.

What I regard as new, and desire to secure by Letters Patent, is:

1. The combination with a baby carriage equipped with wheels, of a spring metal channeled runner having curved portions formed integrally therewith and clampingly engaging the peripheral portions of a front wheel and rear wheel, said curved portions embracing the peripheral portions of the wheels above the wheel-centers, whereby the clamping action of the spring runner is sufficient to retain the runner without extraneous attachment.

2. A detachable runner for the purpose set forth, comprising a channel-form member with an upwardly and rearwardly curved front portion and an upwardly and forwardly curved rear portion connected with the body of the runner by a heel, all of the parts of said runner being joined in integral formation and of spring metal and said curved portions extending upwardly to embrace the wheel peripheries above the wheel-center, whereby the clamping action of the runner upon the two wheels embraced is sufficient to secure the runner.

3. As a new article of manufacture, a sleigh runner formed of a single piece of resilient material oppositely curved at the ends and adapted to respectively embrace the front and rear wheels of a vehicle, said curved ends having longitudinal channels and being curved to correspond to the wheels of a vehicle whereby the runner is adapted to engage said wheels and be held thereon by the resiliency of the material of which it is made and by extending above the center of the wheel.

ARTHUR J. ADAMS.

Witnesses:
A. U. THORIEN,
J. H. LANDIS.